US011755373B2

(12) United States Patent
Rose et al.

(10) Patent No.: US 11,755,373 B2
(45) Date of Patent: Sep. 12, 2023

(54) COMPUTATION AND STORAGE OF OBJECT IDENTITY HASH VALUES

(71) Applicant: Oracle International Corporation, Redwood Shores, CA (US)

(72) Inventors: John Robert Rose, San Jose, CA (US); Mikael Vidstedt, Santa Clara, CA (US); Erik Österlund, Västerhaninge (SE)

(73) Assignee: Oracle International Corporation, Redwood Shores, CA (US)

( * ) Notice: Subject to any disclaimer, the term of this patent is extended or adjusted under 35 U.S.C. 154(b) by 226 days.

(21) Appl. No.: 17/065,354

(22) Filed: Oct. 7, 2020

(65) Prior Publication Data
US 2022/0107840 A1 Apr. 7, 2022

(51) Int. Cl.
*G06F 9/50* (2006.01)
*G06F 9/54* (2006.01)
(Continued)

(52) U.S. Cl.
CPC .......... *G06F 9/5016* (2013.01); *G06F 9/3009* (2013.01); *G06F 9/544* (2013.01);
(Continued)

(58) Field of Classification Search
CPC ...... G06F 9/3009; G06F 9/5016; G06F 9/544; G06F 12/0238; G06F 12/0253;
(Continued)

(56) References Cited

U.S. PATENT DOCUMENTS

| 6,324,637 B1 | 11/2001 | Hamilton |
| 6,915,296 B2 | 7/2005 | Parson |

(Continued)

FOREIGN PATENT DOCUMENTS

| WO | WO-2016073019 A1 * | 5/2016 | ............ G06F 17/30 |
| WO | 2017/053754 A1 | 3/2017 | |
| WO | 2017/178114 A9 | 12/2017 | |

OTHER PUBLICATIONS

How to Implement Java's hashCode Correctly, May 19, 2016, Available online at <https://www.sitepoint.com/how-to-implement-javas-hashcode-correctly/>, 7 pages.
(Continued)

*Primary Examiner* — Aracelis Ruiz
(74) *Attorney, Agent, or Firm* — Invoke

(57) ABSTRACT

Techniques for computing and storing object identity hash values are disclosed. In some embodiments, a runtime system generates a value, such as a nonce, that is unique to a particular allocation region within memory. The runtime system may mix the value with one or more seed values that are associated with one or more respective objects stored in the allocation region. The runtime system may obtain object identifiers for the respective objects by applying a hash function to the result of mixing the seed value with at least the value associated with the allocation region. Conditioning operations may also be applied before, during or after the mixing operations to make the values appear more random. The nonce value may be changed from time to time, such as when memory is recycled in the allocation region, to reduce the risk of hash collisions.

20 Claims, 9 Drawing Sheets

(51) Int. Cl.
*G06F 12/02* (2006.01)
*G06F 12/1018* (2016.01)
*G06F 9/30* (2018.01)

(52) U.S. Cl.
CPC ...... *G06F 12/0238* (2013.01); *G06F 12/0253* (2013.01); *G06F 12/1018* (2013.01)

(58) Field of Classification Search
CPC .. G06F 12/10; G06F 12/1018; G06F 12/1408; G06F 21/53; G06F 21/64; G06F 2212/1016; G06F 2212/1052; G06F 2212/656; G06F 2212/657
See application file for complete search history.

(56) References Cited

U.S. PATENT DOCUMENTS

| | | | | |
|---|---|---|---|---|
| 7,269,705 | B1* | 9/2007 | Seidl | G06F 9/5016 |
| | | | | 711/170 |
| 7,523,081 | B1 | 4/2009 | Engebretsen | |
| 9,135,169 | B2 | 9/2015 | Kawachiya et al. | |
| 9,503,435 | B2 | 11/2016 | Mizrahi et al. | |
| 2005/0102670 | A1* | 5/2005 | Bretl | G06F 9/544 |
| | | | | 718/1 |
| 2006/0026379 | A1* | 2/2006 | Jung | G06F 9/5016 |
| | | | | 711/170 |
| 2006/0143168 | A1 | 6/2006 | Rossmann | |
| 2007/0162528 | A1* | 7/2007 | Wright | G06F 12/0253 |
| | | | | 711/E12.009 |
| 2007/0234005 | A1 | 10/2007 | Erlingsson et al. | |
| 2009/0132622 | A1* | 5/2009 | Rossmann | G06F 12/0261 |
| 2013/0290648 | A1* | 10/2013 | Shao | G06F 3/061 |
| | | | | 711/E12.001 |
| 2014/0032922 | A1 | 1/2014 | Spilman | |
| 2016/0124802 | A1* | 5/2016 | Gabor | G06F 11/10 |
| | | | | 714/807 |
| 2016/0170649 | A1* | 6/2016 | Ramesh | G06F 3/0688 |
| | | | | 711/165 |
| 2019/0042440 | A1* | 2/2019 | Kumar | G06F 12/0864 |

OTHER PUBLICATIONS

Lokesh Gupta, "Java Secure Hashing—MD5, SHA256, SHA512, PBKDF2, BCrypt, Scrypt," Available online at <https://howtodoinjava.com/security/how-to-generate-secure-password-hash-md5-sha-pbkdf2-bcrypt-examples/> printed on Apr. 14, 2020, 38 pages.

Saxena et al., "Key and Value Paired Data using Java Hash Table," International Journal of Engineering and Management Research, vol. 4, Issue 1, Feb. 2014, pp. 81-89.

* cited by examiner

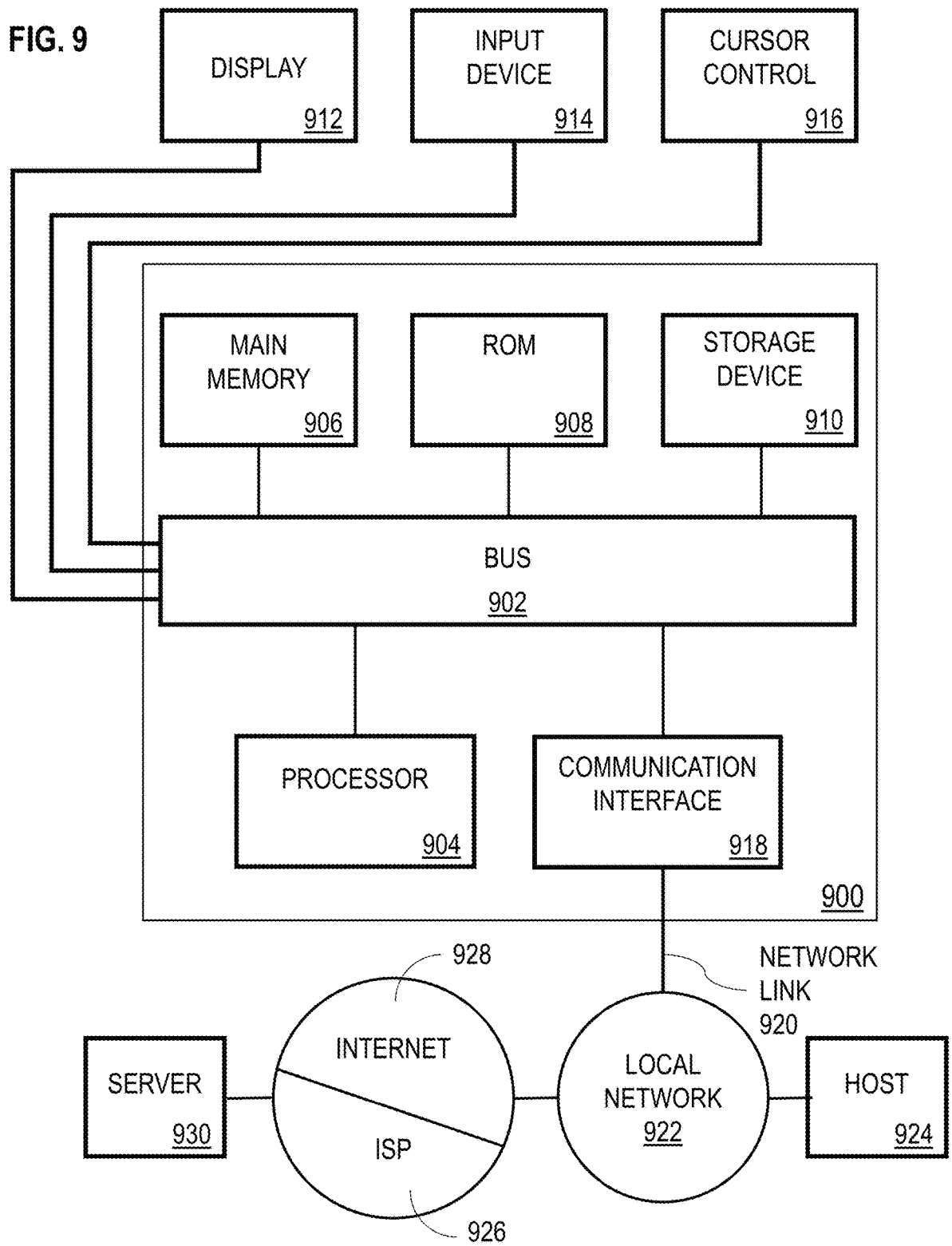

COMPUTATION AND STORAGE OF OBJECT IDENTITY HASH VALUES

TECHNICAL FIELD

The present disclosure relates to efficient computation and storage of object identity hash values in computing systems.

BACKGROUND

Runtime environments for many programming languages manage the allocation of objects within application memory. During or after the allocation process for a new object, the runtime environment may assign a unique object identifier. One approach for assigning an object identifier is to apply a hash function to a seed value obtained by incrementing a global counter. However, the use of incremental seed values may allow users to more easily deduce how the runtime environment generated the unique identifiers, potentially compromising system security and data integrity. Further, if the counter overflows, then repeated seed values will begin to present to the hash algorithm, increasing the likelihood of hash collisions.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings:

FIG. 9 shows a block diagram that illustrates a computer system in accordance with one or more embodiments.

DETAILED DESCRIPTION

Figure 1:
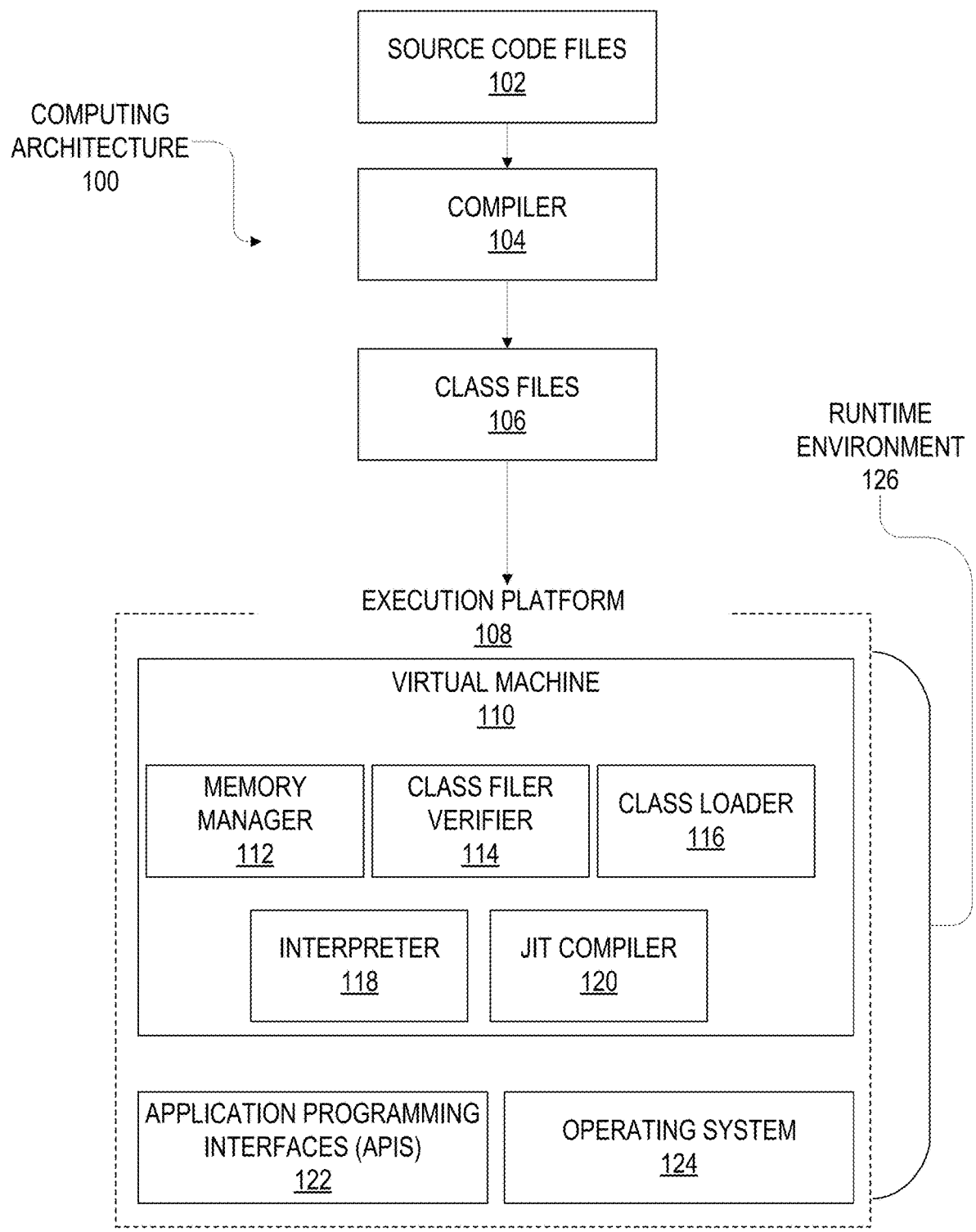
FIG. 1 illustrates an example computing architecture in which techniques described herein may be practiced in accordance with some embodiments.

In the following description, for the purposes of explanation, numerous specific details are set forth in order to provide a thorough understanding. One or more embodiments may be practiced without these specific details. Features described in one embodiment may be combined with features described in a different embodiment. In some examples, well-known structures and devices are described with reference to a block diagram form in order to avoid unnecessarily obscuring the present invention.

1. GENERAL OVERVIEW
2. RUNTIME ENVIRONMENTS
3. OBJECT IDENTIFIER COMPUTATION
3.1 PROCESS OVERVIEW
3.2 ALLOCATION-BASED NONCE VALUES
3.3 SOURCES OF SALT
4. RUNTIME CONSIDERATIONS
4.1 UPDATING AND STORING VALUES
4.2 VARIABLE-LENGTH OBJECT IDENTIFIERS
5. STRUCTURAL HASHING
6. HARDWARE IMPLEMENTATIONS
7. MISCELLANEOUS; EXTENSIONS

1. General Overview

Techniques are described herein for optimizing the computation and storage of object identity hash values. In some embodiments, a runtime environment derives object identifiers as a function of seed values a set of one or more other values, also referred to herein as "salt" values. The runtime environment may derive the object identifiers by performing mixing, conditioning, and/or hashing of the seed value, the salt value(s), and/or intermediate values derived based on one or more of the seed value and the salt value(s). The techniques allow the runtime environment to generate unpredictable object identifiers with individual bits that are, or appear to be, statistically independent, thereby improving system security.

The techniques further allow for efficient computation of object identifiers by minimizing the risk of hash collisions. To mitigate the risk of hash collisions, a constraint may be enforced such that the number of distinct hash codes generated exceeds the square of the maximum number of objects alive within the runtime environment at any given moment. The "birthday paradox" dictates that even if a hash code algorithm is perfectly random and may only assume a maximum of $2^n$ different values, then a hash table of more than $2^{n/2}$ entries is likely to have collisions in excess of the number to be expected if the keys were randomly chosen table indexes. Thus, if hash codes are 32-bits in length, then the performance of hash tables larger than 100,000 entries is likely worse, in terms of computational efficiency, than random assignment. The techniques may further optimize computational efficiency by avoiding the use of cryptographic hash function.

In some embodiments, the runtime environment mixes seed values and/or hash codes with "nonce" values that are unique per allocation region in memory. A nonce may be an arbitrary, random, or pseudo-random value that is assigned once to a corresponding allocation region in memory. The runtime environment may generate unique identifiers for objects stored in the allocation region as a function of the nonce value and one or more other values, including a seed value, for the object. For example, the runtime environment may mix bits of the nonce value with the seed value and apply a hash function to the combined value to derive a hash value. The resulting hash value may be used as the object identifier or further conditioned to derive the object identifier. As another example, the runtime environment may apply a hash function to a conditioned or unconditioned seed value to derive a hash value. The runtime environment may then condition the hash value and/or mixing the hash value with bits of a nonce value to derive the object identifier.

In some embodiments, memory addresses are used as seed values to derive object identifiers. A memory address uniquely identifies an object at a given point in time. However, at different points in time, several objects may be allocated at the same location in memory, leading to a paucity of distinct seed value, and hence hash collisions in tables larger than the square of distinct seed values. Adding a nonce and/or other salt values may ensure that hash codes of objects successively allocated at the same address differ, as long as different salt values are applied to the successively allocated objects. The runtime environment may ensure different salt values are applied to successively allocated objects by changing the nonce assigned to an allocation region where the objects are stored at least as frequently as memory reclamation events occur within the allocation region. In runtime environments with garbage collection, for example, a new nonce may be assigned to an allocation region each time garbage collection is run within the allocation region.

In some embodiments, other sources of salt may be combined with seed values and/or hash codes. Sources of salt may be extracted from the object itself, such as from an immutable field. Additionally or alternatively, sources external to the object may be used to provide salt values. The sources of salt may be used singly or in combination to condition seed values and/or hash codes.

Embodiments described herein allow hash codes and object identifiers of any size including greater than the machine word size of the system generating the object identifiers. A constraint may be imposed such that the number of objects in recycled areas of memory times the number of salt values is larger than the square of the total number of objects which may be presented to a single hash table. The object identifier size may be predefined, selected by a user, automatically scaled based on the number of objects created within the runtime environment, or determined based on other criteria.

In addition or as an alternative to object identity hashes, embodiments described herein allow for structural hashes of data objects. A structural hash may be mapped to a particular object value, which may not be unique to a single data object at a given point in time. For example, a structural hash may be generated as a function of a string value such that multiple data objects with the same string value are mapped to the same structural hash. In some embodiments, structural hashes are generated as a function of a value extracted from the data object and one or more salt values. The salt values may include a session-based nonce value that is arbitrarily or randomly generated each time a new session with the runtime environment is initiated. Session-based nonce values may be used such that identical object values, which may span multiple allocation regions, map to the same hash code during a given runtime session.

One or more embodiments described in this Specification and/or recited in the claims may not be included in this General Overview section.

2. Runtime Environments

In some embodiments, the techniques described herein for generating and managing object identifiers and hash values are executed within a runtime environment. A runtime environment in this context may include supporting code, tools and/or other hardware/software components that implement a program's execution. One or more components of the runtime environment may vary depending on the programming language of the program's source code, the hardware platform on which the program is executed, the operating system version, and/or other system attributes.

FIG. 1 illustrates an example computing architecture in which techniques described herein may be practiced. Software and/or hardware components described with relation to the example architecture may be omitted or associated with a different set of functionality than described herein. Software and/or hardware components, not described herein, may be used within an environment in accordance with some embodiments. Accordingly, the example environment should not be constructed as limiting the scope of any of the claims.

As illustrated in FIG. 1, computing architecture 100 includes source code files 102 which are compiled by compiler 104 into blueprints representing the program to be executed. Examples of the blueprints include class files 106, which may be loaded and executed by execution platform 108. Execution platform 108 includes runtime environment 126, operating system 124, and one or more application programming interfaces (APIs) 122 that enable communication between runtime environment 126 and operating system 124. Runtime environment 126 includes virtual machine 110 comprising various components, such as memory manager 112 (which may include a garbage collector), class file verifier 114 to check the validity of class files 106, class loader 116 to locate and build in-memory representations of classes, interpreter 118 for executing virtual machine code, and just-in-time (JIT) compiler 120 for producing optimized machine-level code.

In some embodiments, computing architecture 100 includes source code files 102 that contain code written in a particular programming language, such as Java, C, C++, C#, Ruby, Perl, and so forth. Thus, source code files 102 adhere to a particular set of syntactic and/or semantic rules for the associated language. For example, code written in Java adheres to the Java Language Specification. However, since specifications are updated and revised over time, source code files 102 may be associated with a version number indicating the revision of the specification to which source code files 102 adhere. One or more of source code files 102 may be written in a programming language supported by automatic garbage collection.

In various embodiments, compiler 104 converts the source code, which is written according to a specification directed to the convenience of the programmer, to either machine or object code, which is executable directly by the particular machine environment, or an intermediate representation ("virtual machine code/instructions"), such as bytecode, which is executable by virtual machine 110 that is capable of running on top of a variety of particular machine environments. The virtual machine instructions are executable by virtual machine 110 in a more direct and efficient manner than the source code. Converting source code to virtual machine instructions includes mapping source code functionality from the language to virtual machine functionality that utilizes underlying resources, such as data structures. Often, functionality that is presented in simple terms via source code by the programmer is converted into more complex steps that map more directly to the instruction set supported by the underlying hardware on which the virtual machine 110 resides.

In some embodiments, the virtual machine 110 includes an interpreter 118 and a JIT compiler 120 (or a component implementing aspects of both), and executes programs using a combination of interpreted and compiled techniques. For example, the virtual machine 110 may initially begin by interpreting the virtual machine instructions representing the program via the interpreter 118 while tracking statistics related to program behavior, such as how often different sections or blocks of code are executed by the virtual machine 110. Once a block of code surpass a threshold (is "hot"), the virtual machine 110 may invoke the JIT compiler 120 to perform an analysis of the block and generate optimized machine-level instructions which replaces the "hot" block of code for future executions. Since programs tend to spend most time executing a small portion of overall code, compiling just the "hot" portions of the program can provide similar performance to fully compiled code, but without the start-up penalty. Furthermore, although the optimization analysis is constrained to the "hot" block being replaced, there still exists far greater optimization potential than converting each instruction individually. There are a number of variations on the above described example, such as tiered compiling.

In other embodiments, the runtime environment 126 may not include a virtual machine. For example, some static and stack-based environments do not execute programs using a virtual machine. A runtime environment may include supporting code, tools and/or other hardware/software components that implement a given program's execution. One or more components of the runtime environment may vary depending on the programming language of the source code, the hardware platform on which the program is executed, and/or the operating system version.

The source code files 102 have been illustrated as the "top level" representation of the program to be executed by the execution platform 108. Although the computing architecture 100 depicts the source code files 102 as a "top level" program representation, in other embodiments the source code files 102 may be an intermediate representation received via a "higher level" compiler that processed code files in a different language into the language of the source code files 102.

In some embodiments, the compiler 104 receives as input the source code files 102 and converts the source code files 102 into class files 106 that are in a format expected by the virtual machine 110. For example, in the context of the JVM, the Java Virtual Machine Specification defines a particular class file format to which the class files 106 are expected to adhere. In some embodiments, the class files 106 contain the virtual machine instructions that have been converted from the source code files 102. However, in other embodiments, the class files 106 may contain other structures as well, such as tables identifying constant values and/or metadata related to various structures (classes, fields, methods, and so forth).

Figure 2:
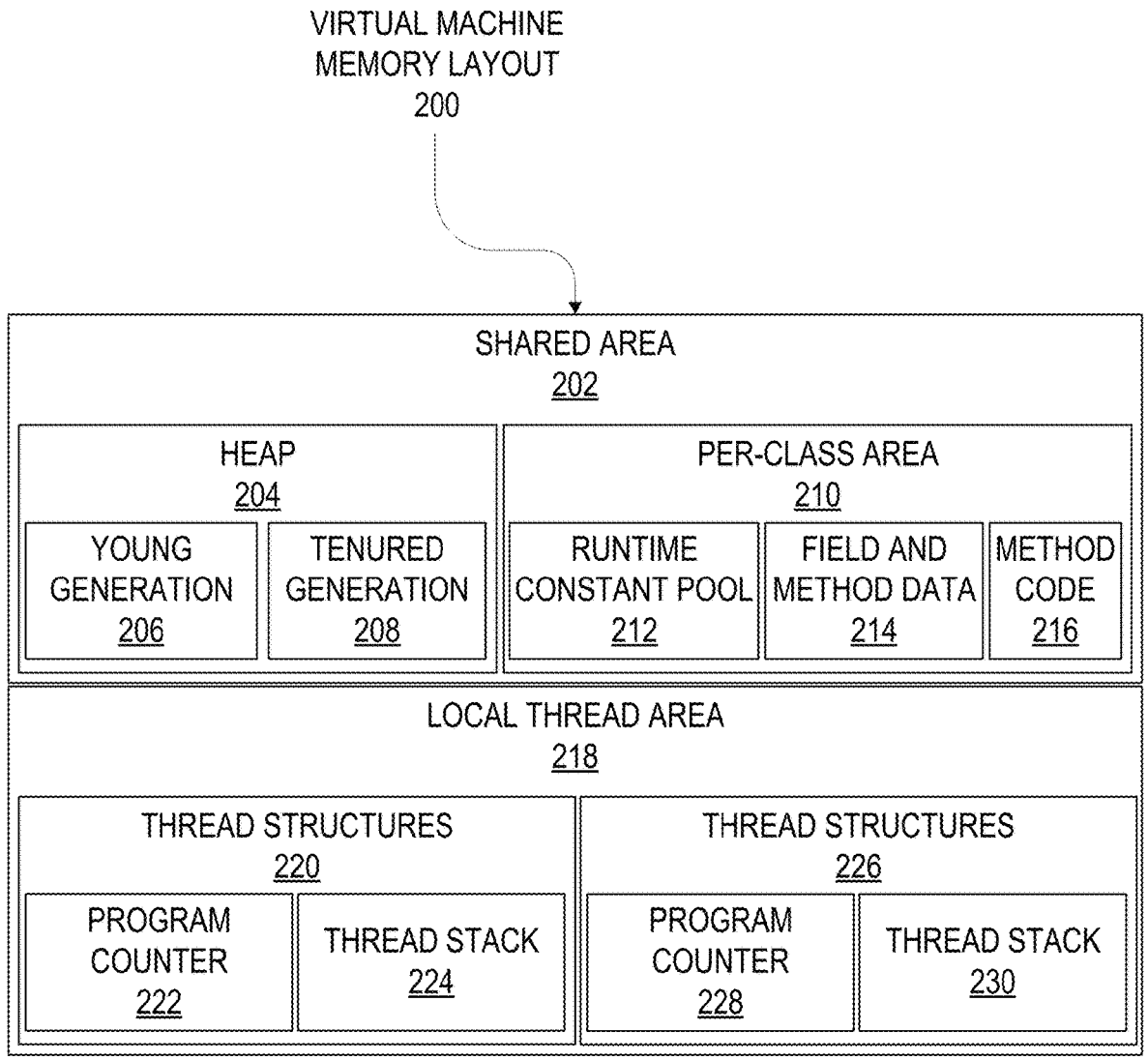
FIG. 2 illustrates an example virtual machine memory layout according to some embodiments.

FIG. 2 illustrates example virtual machine memory layout 200 according to some embodiments. A virtual machine (e.g., virtual machine 110) may adhere to the virtual machine memory layout 200 depicted in FIG. 2. In other embodiments, the memory layout of the virtual machine 110 may vary, such as by including additional components and/or omitting one or more of the depicted components, depending on the runtime environment. Although components of the virtual machine memory layout 200 may be referred to as memory areas or allocation regions, there is no requirement that the areas and regions are physically contiguous.

In the example illustrated by FIG. 2, the virtual machine memory layout 200 is divided into a shared area 202 and a local thread area 218. The shared area 202 represents an area in memory storing structures and objects that are shared among the various threads executing on the virtual machine 110. The shared area 202 includes a heap 204 and a per-class area 210. The local thread area 218 represents an area that stores structures and objects that are local to threads and not shared with other threads. The local thread area 218 may include or correspond to one or more thread local allocation buffers, also referred to as TLABs.

The heap 204 represents an area of memory allocated on behalf of a program during execution of the program. In some embodiments, the heap 204 includes a young generation 206 and a tenured generation 208. The young generation 206 may correspond to regions of the heap that stores newly created objects during program execution. When the young generation 206 is filled, the oldest objects are promoted to the tenured generation 208 to free up space for new objects in the young generation 206. Promoting an object may comprise moving the object to a different region and/or reclassifying the object.

A per-class area 210 represents the memory area where the data pertaining to the individual classes are stored. In some embodiments, the per-class area 210 includes, for each loaded class, a run-time constant pool 212 representing data from a constant table of the class, field and method data 214 (for example, to hold the static fields of the class), and method code 216 representing the virtual machine instructions for methods of the class.

As previously mentioned, the local thread area 218 represents a memory area where structures specific to individual threads are stored. In FIG. 2, the local thread area 218 includes thread structures 220 and thread structures 226, representing the per-thread structures utilized by different threads. In order to provide clear examples, the local thread area 218 depicted in FIG. 2 assumes two threads are executing on the virtual machine 110. However, in a practical environment, the virtual machine 110 may execute any arbitrary number of threads, with the number of thread structures scaled accordingly.

In some embodiments, the thread structures 220 include the program counter 222 and the thread stack 224. Similarly, the thread structures 226 include the program counter 228 and the thread stack 230.

In some embodiments, the program counter 222 and the program counter 228 store the current address of the virtual machine instruction being executed by their respective threads. Thus, as a thread steps through the instructions, the program counters are updated to maintain an index to the current instruction.

In some embodiments, the thread stack 224 and the thread stack 230 each store stack frames for their respective threads, where each stack frame holds local variables for a function. A frame is a data structure that may be used to store data and partial results, return values for methods, and/or perform dynamic linking. A new frame is created each time a method is invoked. A frame is destroyed when the method that caused the frame to be generated completes. Thus, when a thread performs a method invocation, the virtual machine 110 generates a new frame and pushes the frame onto the virtual machine stack associated with the thread.

When a method invocation completes, the virtual machine 110 passes back the result of the method invocation to the previous frame and pops the current frame off of the stack. In some embodiments, for a given thread, one frame is active at any point. This active frame is referred to as the current frame, the method that caused generation of the current frame is referred to as the current method, and the class to which the current method belongs is referred to as the current class.

The thread stack 224 and the thread stack 230 may correspond to native operating system stacks or virtual thread stacks. Generally, the number of virtual threads executing on a machine is much greater than the number of native threads.

Figure 3:
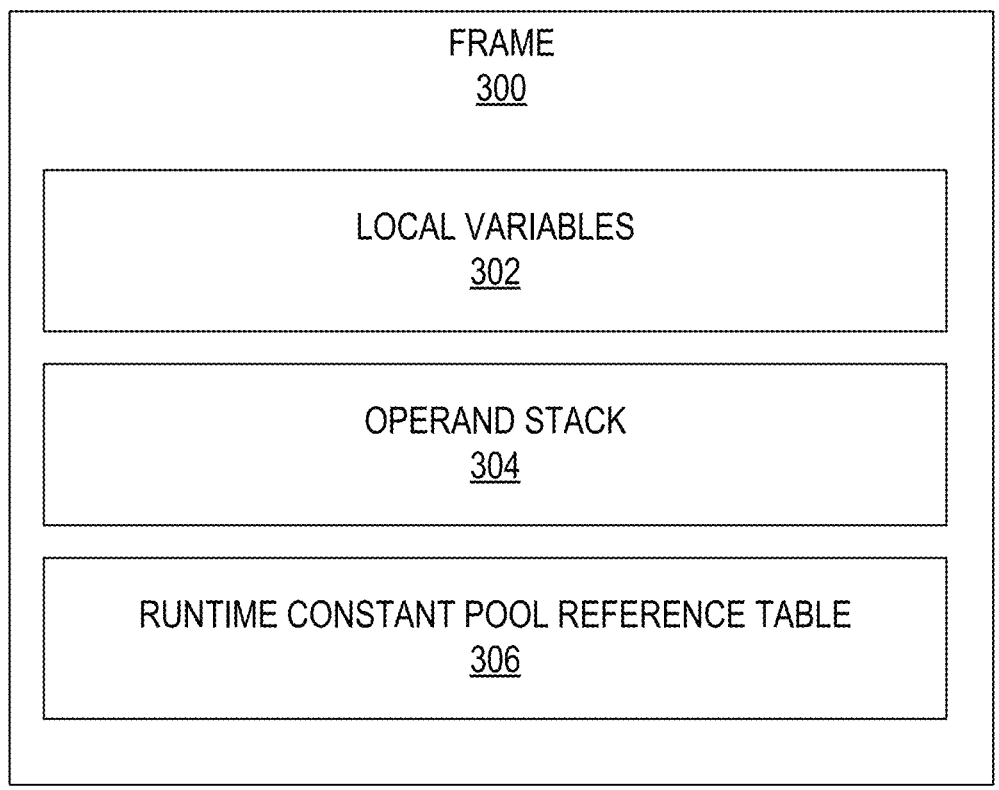
FIG. 3 illustrates an example frame layout according to some embodiments.

FIG. 3 illustrates an example frame layout for a frame 300 according to some embodiments. In some embodiments, frames of a thread stack, such as the thread stack 224 and the thread stack 230 adhere to the structure of the frame 300.

In some embodiments, the frame 300 includes local variables 302, an operand stack 304, and a run-time constant pool reference table 306. In some embodiments, the local variables 302 are represented as an array of variables that each hold a value, for example, boolean, byte, char, short, int, float, or reference. Further, some value types, such as longs or doubles, may be represented by more than one entry in the array. The local variables 302 may be used to pass parameters on method invocations and store partial results. For example, when generating the frame 300 in response to invoking a method, the parameters may be stored in pre-defined positions within the local variables 302, such as indexes 1-n corresponding to the first to $n^{th}$ parameters in the invocation. The parameters may include pointers and other references.

In some embodiments, the operand stack 304 is empty by default when the frame 300 is created by the virtual machine 110. The virtual machine 110 then supplies instructions from the method code 216 of the current method to load constants or values from the local variables 302 onto the operand stack 304. Other instructions take operands from the operand stack 304, operate on them, and push the result back onto the operand stack 304. Furthermore, the operand stack 304 is used to prepare parameters to be passed to methods and to receive method results. For example, the parameters of the method being invoked could be pushed onto the operand stack 304 prior to issuing the invocation to the method. The virtual machine 110 then generates a new frame for the method invocation where the operands on the operand stack 304 of the previous frame are popped and loaded into the local variables 302 of the new frame. When the invoked method terminates, the new frame is popped from the virtual machine stack and the return value is pushed onto the operand stack 304 of the previous frame.

In some embodiments, the run-time constant pool reference table 306 contains a reference to the run-time constant pool of the current class (e.g., the runtime constant pool 212). The run-time constant pool reference table 306 is used to support resolution. Resolution is the process whereby symbolic references in the constant pool are translated into concrete memory addresses, loading classes to resolve as-yet-undefined symbols and translating variable accesses into appropriate offsets into storage structures associated with the run-time location of these variables.

3. Object Identifier Computation

3.1 Process Overview

In some embodiments, object identifiers are computed for objects allocated within a runtime environment, such as the runtime environment 126. Example objects may include variables, data structures, functions, class objects, methods, and primitive datatypes. An object may correspond to one or more storage regions where an object value or set of values are stored. The value or set of values may be accessed using the unique identifier assigned to the object. An object may be stored in a region accessible to multiple threads or a region that is local to single thread, such as a TLAB.

Figure 4:
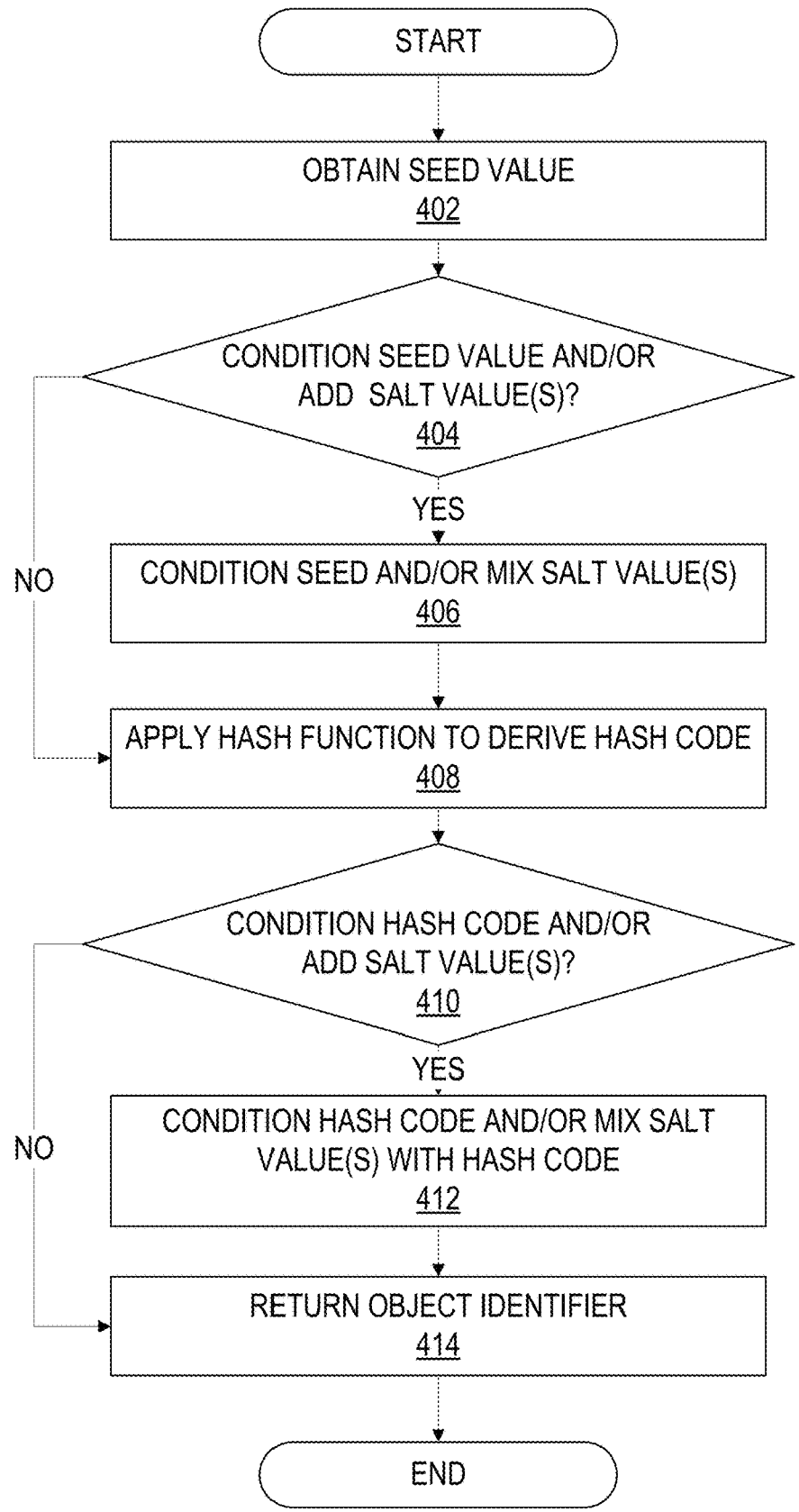
FIG. 4 illustrates an example set of operations for generating conditioned object identifiers according to some embodiments.

FIG. 4 illustrates an example set of operations for generating conditioned object identifiers according to some embodiments. One or more operations illustrated in FIG. 4 may be modified, rearranged, or omitted all together. Accordingly, the particular sequence of operations illustrated in FIG. 4 should not be construed as limiting the scope of one or more embodiments.

Referring to FIG. 4, the process obtains a seed value for an object (operation 402). The seed value that is used may vary depending on the particular implementation. In some embodiments, the seed value is one that is temporally or otherwise related to the object at the time the process is executing. For example, the seed value may be a memory address identifying a location in memory where the object is currently stored. As another example, the process may obtain a seed value by obtaining a current value from a global counter. Other sources may also be used to obtain a seed value.

In some embodiments, the process determines whether to condition and/or add salt values the seed value (operation 404). If so, then the process proceeds by conditioning the seed value and/or mixing the salt values (operation 406). The salt may be added before, during, or after conditioning of the seed value. In other cases, the salt may be added to an unconditioned seed value or the seed may be conditioned without adding salt. The manner in which the seed value is conditioned may vary from implementation to implementation. As an example, a 32-bit seed may be multiplied by a 64-bit pseudo-random constant and a bitfield extracted from the middle of the 128-bit result. As another example, the seed value may be subjected to a cascade of shift and XOR operations. Additionally or alternatively, other conditioning functions may be applied. The conditioning functions may "stretch" and "mix" the seed value into a bit-vector of a desired size whose bits appear random.

In some embodiments, if the salt is not already random, then the salt may be conditioned in addition or as an alternative to the seed value. For example, one or more of the aforementioned conditioning functions, such as the cascade of shift and XOR operations, may be applied to a salt value. The pre-conditioned salt may then be mixed with a conditioned or unconditioned seed value. A mixing function may receive, as input, the salt value(s) and seed value. The mixing function may mix the bits of the input values according to predefined logic and output the resulting bit-vector.

The process further applies a hash function to derive a hash code (operation 408). In some embodiments, the hash function is applied to the value obtained by conditioning and/or mixing operations described above. In other embodiments, the hash function may be applied to an unconditioned seed without any added salt. A hash function may take the value, which may be arbitrary in size, as input, and map the value to a fixed-size hash code. In some embodiments, a non-cryptographic hash function is used to reduce processing overhead within the runtime environment. Example non-cryptographic hash functions include the MD5 message-digest algorithm and rolling hash functions. Other cryptographic and/or non-cryptographic hash functions may be used, depending on the particular implementation.

In some embodiments, the process determines whether to condition and/or add salt values the hash code (operation 410). If so, then the process proceeds by conditioning the hash code and/or adding the salt values (operation 412). One or more techniques described in connection with operation 406 for conditioning the seed value and/or mixing salt may be applied to the hash code.

The process further returns the conditioned or unconditioned hash code as the unique identifier for the object (operation 414). The object identifier may be provided to other applications and/or users as a handle to access the corresponding object. Applications may include the object identifier in requests to read one or more values from the referenced object. The runtime environment 126 may use the object identifier provided in the request to locate the corresponding object in memory and return the requested value(s).

3.2 Allocation-Based Nonce Values

In some embodiments, the runtime environment 126 assigns unique nonce values to allocation regions in memory. A nonce may be assigned as an arbitrary, random, or pseudo-random value, such as a global number. The nonce may be unique and used only once per runtime session for a given allocation region. The runtime environment 126 may use the nonce value assigned to an allocation region as a source of salt for objects that are allocated within the region. The same nonce value may be shared as salt for multiple objects that are stored in the same allocation region. Thus, a nonce value may be used more than once to generate multiple distinct object identifiers, which mitigates the processing overhead of generating random or pseudo-random salt for each newly allocated object.

In some embodiments, allocation regions include one or more shared memory regions, such as the shared area 202. Nonce values may be computed for each shared memory region, where each shared memory region may comprise one or more memory segments. The runtime environment 126 may compute object identifiers for objects that are allocated within the shared area 202 as a function of the nonce assigned to the shared area 202 and a seed value associated with the object. The bits of the nonce may be mixed with the seed value and/or hash code as previously described to obtain the object identifier. Other sources of salt may also be mixed in, depending on the particular implementation.

Additionally or alternatively, an allocation region and corresponding nonce value may be localized. For example, a nonce may be computed as part of a thread local allocation buffer provisioned by a virtual machine for use by a given thread. Objects allocated within a given instance of the thread local allocation buffer may also be associated with the nonce assigned to the buffer, and the nonce may be used as salt to compute corresponding object identifiers.

Additionally or alternatively, a nonce value may be assigned per segment of memory, such as a virtual memory page. Objects allocated within a given virtual memory page may be associated with the nonce assigned to the memory segment, and the nonce may be used as salt to compute corresponding object identifiers for the objects allocated within the virtual memory page.

Figure 5:
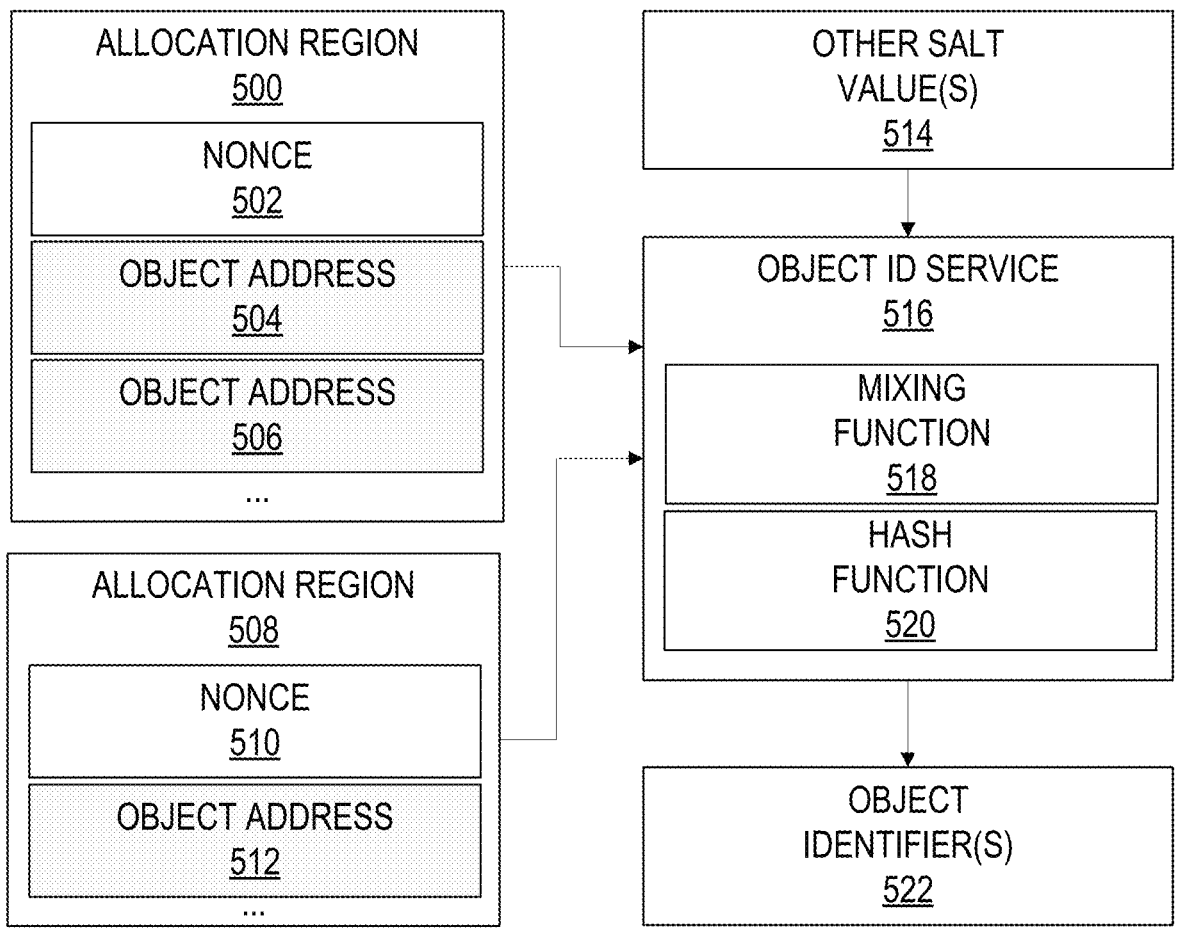
FIG. 5 illustrates an example dataflow for computing object identifiers as a function of allocation-based nonce values and memory address according to some embodiments.

FIG. 5 illustrates an example dataflow for computing object identifiers as a function of allocation-based nonce values and memory address according to some embodiments. Allocation region 500 and allocation region 508 represent different areas within memory from which the runtime environment 126 may allocate new objects. Nonce 502 is associated with objects allocated within allocation region 500, including objects allocated at object address 504 and object address 506. Nonce 510 is associated with objects allocated within allocation region 508, including objects allocated at object address 512. It is noted that the number of allocation regions, nonce values, and objects per allocation region may vary from that depicted in FIG. 5 depending on the runtime environment and/or the current state of program execution.

An object ID service 516 comprises one or more threads for computing object identifiers 522. The object ID service 516 includes a mixing function 518 and a hash function 520. The mixing function 518 receives, as input, two or more input values and outputs a bit-vector computed by mixing the bits of the two or more input values according to predefined mixing logic. Mixing may include shifting, extending, padding, and/or applying logical operators, such as the XOR and AND operators, to the input bit-vectors. In some embodiments, the input bit-vectors include an object address and a nonce associated with an object. The object address may be referred to as the seed value and the nonce as the salt to be mixed with the seed. As an example, the mixing function 518 may mix all or a subset of the bits of the object address 504 with the nonce 502 to obtain an intermediate value for the object located by object address 504. Similarly, the mixing function 518 may mix the bits of the object address 506 with the nonce 502 and the object address 512 with the nonce 510 to compute respective intermediate values for the corresponding objects.

In some embodiments, the mixing function 518 mixes one or more other salt value(s) 514 in addition or as an alternative to the nonce. Example sources of other salt values are described in further detail in Section 3.3, titled "Sources of Salt", below.

Additionally or alternatively, the mixing function 518 may perform conditioning operations to stretch and mix seed values (e.g., object address 504, object address 506, object address 512), salt values (e.g., nonce 502, nonce 510, other salt value(s) 514), intermediate values, and/or hash codes. For example, a seed, salt, intermediate value, and/or hash code may be multiplied by a random constant or subjected to a cascade of shift and XOR operations as previously described.

The hash function 520 is configured to take a value, such as the intermediate value output by the mixing function 518, and output a hash code. The resultant hash code may be used as the object identifier. In other embodiments, the hash code may be fed back through the mixing function 518 for conditioning and/or mixing with additional salt values to generate the final object identifier.

In some embodiments, the mixing function 518 may mix salt with other sources of seed values. For example, the object ID service 516 may maintain a global counter. When a request to generate an object identifier is received, the object ID service 516 may use the current value as the seed and increment the counter or, alternatively, increment the counter and use the incremented value as the seed. The count value may then be mixed with a nonce and/or other salt value(s) 514.

3.3 Sources of Salt

As previously mentioned, other sources of salt may be mixed or otherwise added to a seed value in addition or as an alternative to the allocation-based nonce value. In some embodiments, the other sources of salt include intrinsic salt values. Intrinsic salt refers to values that are extracted from the object itself. If an object has an immutable field, which it retains throughout its lifetime, then salt may be obtained from the value of that field. Multiple fields may provide multiple independent sources of intrinsic salt. For example, the "class" field of objects in some programming languages is an immutable field that stores a class identifier, such as a class identity hash code. As another example, a final field may be used if the runtime environment 126 successfully verifies that the field will never be changed. In these examples, since the salt is an intrinsic property of the object, it may alternatively be viewed as additional "seed" bits. The difference between seed and salt is, thus, unimportant as they are mixed together. As such, the use of these two terms is an expository aid rather than a mathematical distinction.

In some embodiments, the source of salt may include extrinsic salt, which originates from outside the object. Extrinsic salt may be used with many objects if their seeds differ or the combination with other salt values is unique. Shared salt may leverage more computationally demanding sources with negligible performance impact since the cost of creation is amortized over multiple objects. Examples include hardware "random number" queries to obtain a value from a hardware random number generator, timer queries to obtain timestamp values, and cryptographic hashes. Additionally or alternatively, other sources of extrinsic salt, such as a pseudo-random number generator (PRNG), may be used. If not already random, the salt may be pre-conditioned by a mixing function such that the bits appear random.

One or more sources of extrinsic salt may be used as a nonce value. The nonce value may include allocation-based nonce values that are assigned to particular allocation region as previously described. Additionally or alternatively, nonce values may be associated with groups of objects through other attributes. For example, the runtime environment 126 may generate a new nonce value each time a new session is initiated. If an allocation-based nonce value is not available, then the session-based nonce value may be used as salt.

4. Runtime Considerations

4.1 Updating and Storing Values

Nonce and other salt values may be changed from time to time. Updating the nonce values may prevent duplicate combinations of seed and salt values from being fed to the hash function 520. If an object address is used as a seed value, then the risk of a collision arises in the event memory is recycled and a different object is stored at the same address. If a global counter is used as a seed value, then the risk of a collision arises in the event that the counter overflows. Responsive to such events, the allocation-based nonce and/or other salt values may be changed to avoid collisions.

In some embodiments, events may further trigger storage of information sufficient to recompute or otherwise redetermine an object identifier. For example, the result of generating an identifier for an object may be recorded by permanently associating, with the object, any part of the seed or salt that cannot be recomputed from the object. For counter-based seeds, the counter may be immediately stored with the object. For pointer-based seeds, the storage may be delayed until the object is moved to a new location, such as by a garbage collector. For field-based (intrinsic salt), no additional recording is needed since the value may be extracted from the object itself. For extrinsic salt such as nonce values, recording may be performed before the salt changes. In the case of nonce values associated with a local buffer or memory segment, for instance, the nonce may be recorded along with the original seed value before the nonce for the allocation region is changed.

In some embodiments, the recording techniques may be applied to an intermediate value obtained by combining and/or conditioning the seed and salt values. For example, an intermediate value may be obtained by mixing an object address with an allocation-based nonce value and then conditioning the combined values. The resulting intermediate value may be recorded in addition or as an alternative to the seed and salt values. The object identifier may be obtained by applying a hash function to the intermediate value to derive a hash code. Additionally or alternatively, a fully conditioned identity hash code may be recorded responsive to any of the aforementioned events.

Figure 6:
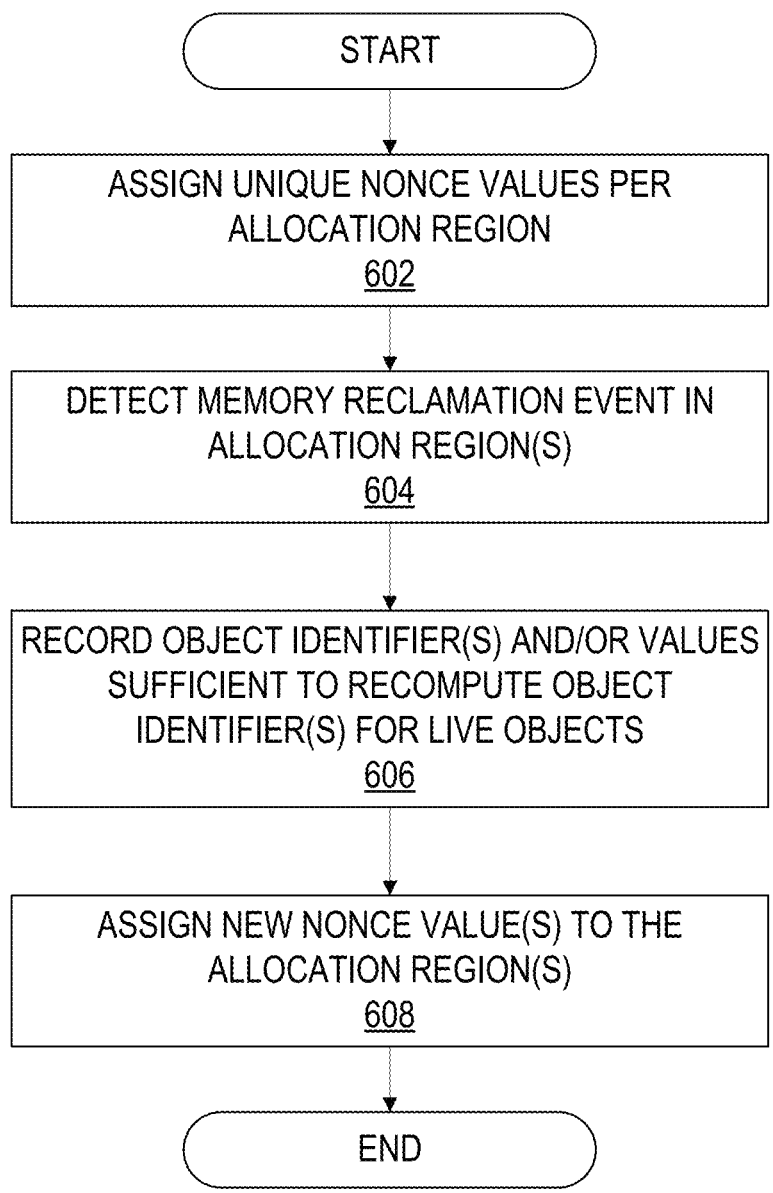
FIG. 6 illustrates an example set of operations for storing and refreshing nonce values responsive to memory reclamation events according to some embodiments.

FIG. 6 illustrates an example set of operations for storing and refreshing nonce values responsive to memory reclamation events according to some embodiments. One or more operations illustrated in FIG. 6 may be modified, rearranged, or omitted all together. Accordingly, the particular sequence of operations illustrated in FIG. 6 should not be construed as limiting the scope of one or more embodiments.

Referring to FIG. 6, the process assigns unique nonce values per allocation region (operation 602). For example, when a slab of memory is readied for allocation, such as a thread local allocation buffer in the young generation, the process may compute a random or pseudo-random nonce value having a particular width (e.g., 64 bit, 128 bit, etc.). The unique nonce may be used as shared salt across objects stored within the allocation region as previously described.

The process further detects a memory reclamation event in one or more of the allocation regions (operation 604). A memory reclamation event may involve moving an object from one allocation region to another. In runtime environments with generational garbage collection, for example, objects may be moved from the young generation to the tenured generation. In other cases, objects may be moved to other regions, depending on the particular runtime environment, to reclaim space and/or optimize the memory layout.

Responsive to detecting the memory reclamation event, the process records the object identifiers and/or other values sufficient to recompute the object identifiers for live objects in the allocation region (operation 606). For example, the process may store an allocation-based nonce, an object address, and/or an intermediate value associated with an object being moved from the allocation region. As another example, the process may compute and store a fully conditioned hash code associated with the object.

In some embodiments, the recorded information is stored in the object header if there is sufficient space. In other embodiments, when a garbage collector or other memory reclamation process moves an object to a new address, then the process may allocate a side record adjacent to the object in the new location and store the recorded information in the record. In other embodiments, the information may be stored in a table indexed by some property of the object, such as the new location and/or value stored in the object headers. The process may mark the object as having stored the recorded information. The runtime environment 126 may determine whether an object has had its identifier computed and recorded based on whether the object has been marked.

Once the information has been recorded, the process assigns a new nonce value to each allocation region that was subject to the memory reclamation event (operation 608). The new nonce value may be a pseudo-random or random number that has not been previously used for the allocation region during the runtime session. The new nonce value may be used to compute object identifiers for objects in the allocation region that have not previously had their object identifiers computed. The previous nonce value may no longer be used for newly allocated objects so that different objects consecutively stored at the same memory address have different added salt resulting in different object identifiers. If an object has had their object identifier computed prior to the nonce update, then the runtime environment 126 may use the recorded information, which may include the previous nonce value. The recorded information may be persisted throughout the life of the runtime session.

4.2 Variable-Length Object Identifiers

In some embodiments, the runtime environment 126 may support multiple available widths of identity hash codes. For example, the runtime environment 126 may support 32-bit, 80-bit, and 256-bit hash codes. Additionally or alternatively, other widths of hash codes may be supported, depending on the particular implementation. The runtime environment 126 may further support different qualities of identity hash codes, such as cryptographic and non-cryptographic hash codes. The width and/or quality of the hash code may be predetermined or selected by a user when a runtime session is initiated. In other cases, the width and/or quality of hash code may be configurable during the runtime session.

In some embodiments, a request for an object identifier may specify the length and/or quality of an object identifier. For example, an application may request a cryptographic or non-cryptographic identity hash having a particular width in bits. In response, the virtual machine 110 may compute only the bits that have been requested and save seed and salt values to reproduce them reliably on request. If a new request for a larger or higher-quality hash code is made later, new salt may be added and/or more conditioning may be applied, such as by running SHA-256 with secret salt. If the additional salt is used, then it may also be recorded for the object in addition to the salt that was previously used to compute the smaller or lower-quality hash code.

In some embodiments, the length and/or quality of an object identifier may be automatically selected based on one or more runtime parameters. For example, the virtual machine 110 may select a bit-width for an identity hash code based on how many objects have been created during a runtime session. When the runtime session is first initiated, the width may be relatively small (e.g., the machine word size or smaller) without risking performance degradation from hash collisions. As the number of objects increases, the width may be increased to ensure that the number of distinct hash codes generated exceeds the square of the maximum number of objects alive within the runtime environment at any given moment.

Figure 7:
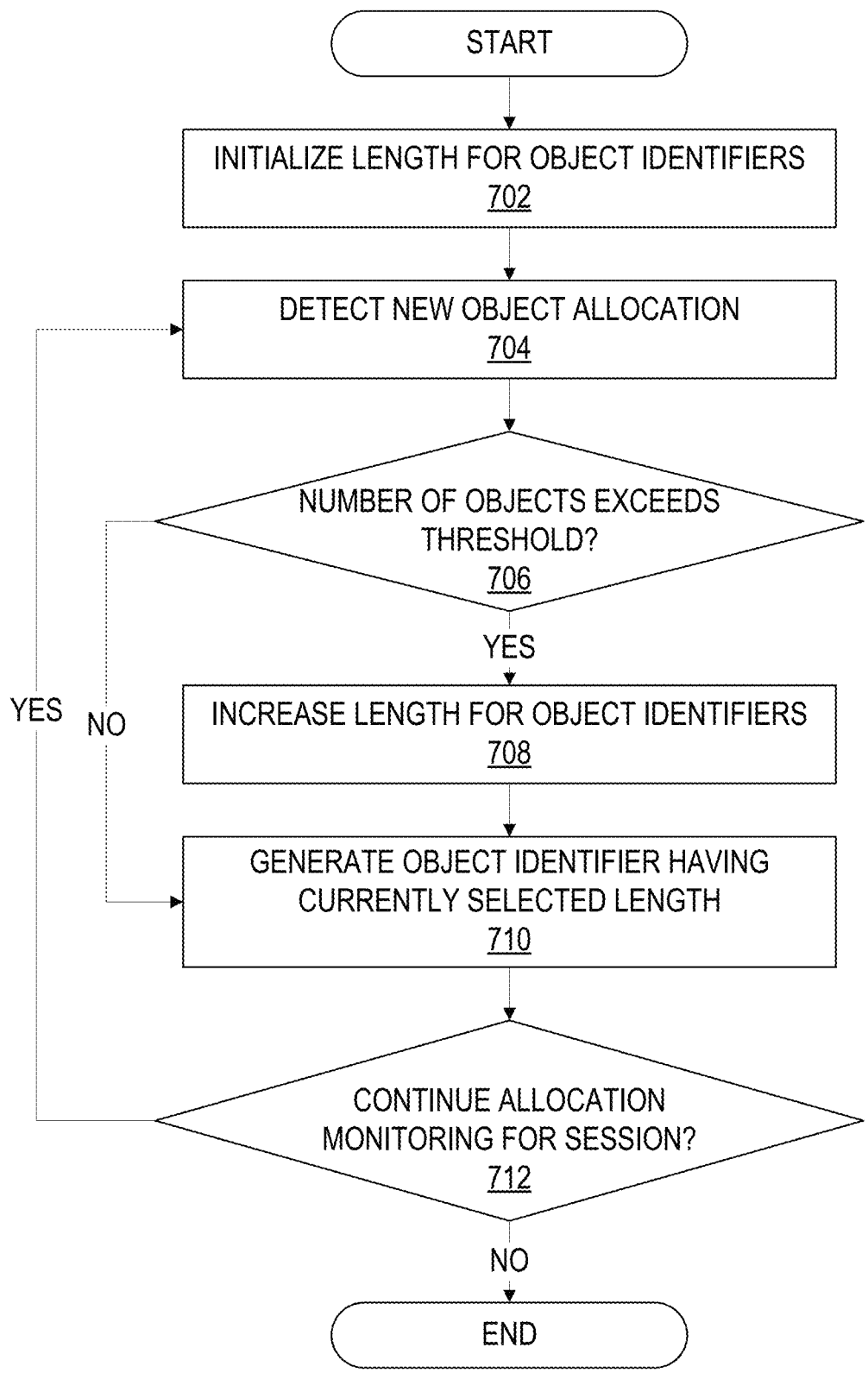
FIG. 7 illustrates an example set of operations for dynamically adjusting the length of object identifiers according to some embodiments.

FIG. 7 illustrates an example set of operations for dynamically adjusting the length of object identifiers according to some embodiments. One or more operations illustrated in FIG. 7 may be modified, rearranged, or omitted all together. Accordingly, the particular sequence of operations illustrated in FIG. 7 should not be construed as limiting the scope of one or more embodiments.

The process includes initializing a length for the object identifiers (operation 702). For example, when a new runtime session is initiated, then the process may default to the lowest available bit-width for an identity hash code. As previously indicated, the lowest bit-width may be the machine word size or smaller. However, the initial width may vary depending on the particular implementation.

The process further includes detecting a new object allocation (operation 704). The process may increment a counter to track how many objects have been allocated during a runtime session. In some cases, the counter may track the total number of objects created over the lifetime of the runtime session. In other embodiments, the counter may track only the total number of live objects. In the latter case, the counter may be decremented when an object is deleted.

The process may determine, based on the counter, whether the number of objects exceeds a threshold (operation 706). The threshold may be selected such that the square of the maximum number of objects alive within the runtime environment is not less than the number of distinct hash codes that may be computed for a selected bit-width.

If the threshold is exceeded, then, the length of the object identifiers is increased (operation 708). Multiple thresholds may be used to gradually step up the length as the number of live objects grows. For example, the length may be initially increased from 32-bit to 80-bit if a first threshold is exceeded. If a second threshold is exceeded, then the length may be increased form 80-bit to 256-bit or some other length. The thresholds and lengths may vary from implementation to implementation.

The process further generates an object identifier having the currently selected length (operation 710). This may be done when the object is first allocated or subsequently responsive to a request for an object identifier.

The process determines whether to continue monitoring new allocations for a runtime session (operation 712). The virtual machine 110 may continue monitoring during the life of a runtime session, and the process may return to operation 704 for each new object allocation.

5. Structural Hashing

In some embodiments, the techniques described herein may be applied to structural hashes. Structural hashes differ from identity hashes in that two distinct objects are mapped to the same hash code if the objects share the same value. Objects with identical values may be stored in distinct allocation regions within the runtime environment 126. In these instances, the same nonce value, such as a session-based nonce, may be used across different allocation regions. The nonce value may be maintained throughout the life or a runtime session to ensure that structural hashes of the same object value are mapped to the same hash code for a given runtime session.

Figure 8:
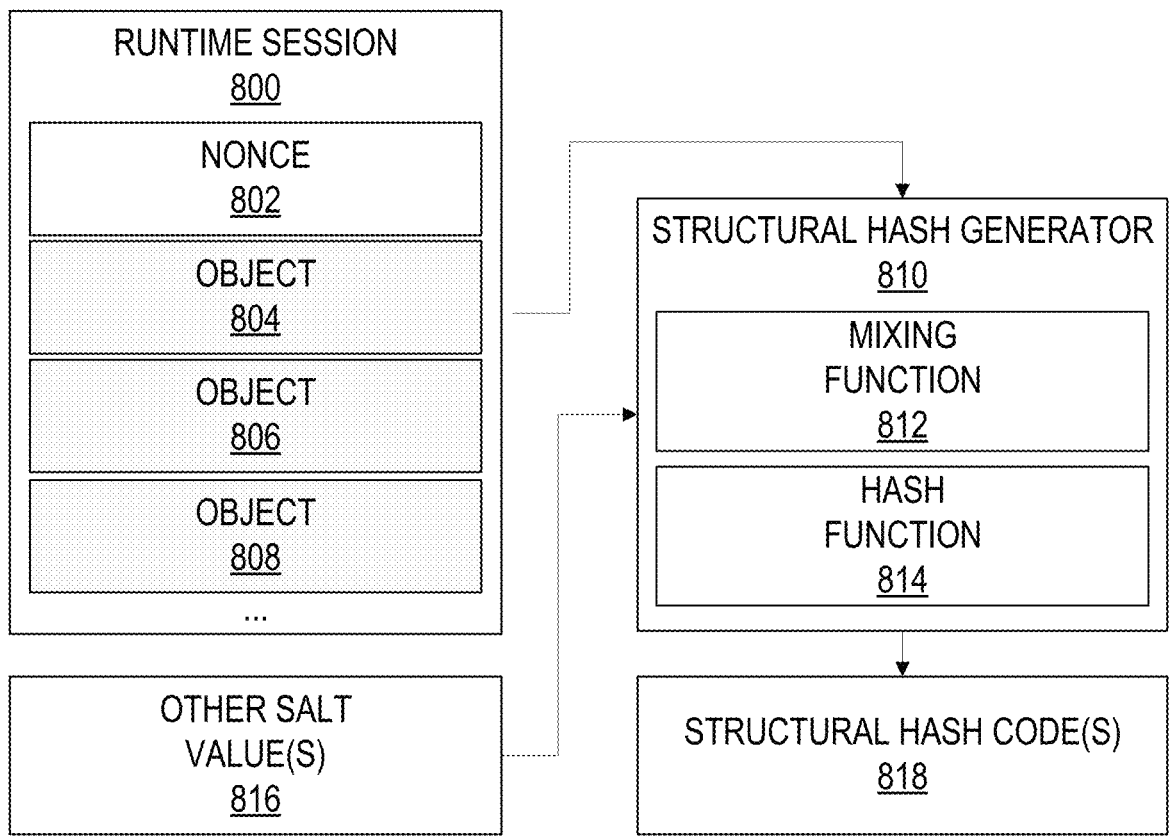
FIG. 8 illustrates an example dataflow for computing structural hashes as a function of session-based nonce values and object values according to some embodiments.

FIG. 8 illustrates an example dataflow for computing structural hashes as a function of session-based nonce values and object values according to some embodiments. Runtime session 800 includes nonce 802, object 804, object 806, and object 808. The nonce 802 may be generated when the runtime session 800 is initiated and persisted without changing through the life of runtime session 800.

A structural hash generator 810 comprises one or more threads for computing structural hash code(s) 818. The structural hash generator 810 includes a mixing function 812 and a hash function 814. The mixing function 812 receives, as input, two or more input values and outputs a bit-vector computed by mixing the bits of the two or more input values according to predefined mixing logic. Mixing may include shifting, extending, padding, and/or applying logical operators to the input bit-vectors. In some embodiments, the input bit-vectors include a value extracted from the object and a nonce. As an example, the mixing function 812 may mix the bits from object 804, object 806, and/or object 806 with the nonce 802. The mixing function 812 may mix one or more other salt value(s) 816 in addition or as an alternative to the nonce 802. The mixing function 518 may further perform conditioning operations to stretch and mix the object values, salt values, intermediate values, and/or hash codes as previously described.

The hash function 814 is configured to take a value, such as the intermediate value output by the mixing function 812, and output a hash code. The resultant hash code may be used as a structural hash for an object. In other embodiments, the hash code may be fed back through the mixing function 812 for conditioning and/or mixing with additional salt values to generate the final structural hash. The structural hash generator 810 may generate the same structural hash for object 804, object 806, and/or object 808 if the object values are identical. For example, if two or more of the objects may be strings storing the same sequence of characters. The structural hash generator 810 may mix the same salt and perform the same conditioning for each object resulting in identical structural hash codes for different objects that store the same string value.

6. Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs), field programmable gate arrays (FPGAs), or network processing units (NPUs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, FPGAs, or NPUs with custom programming to accomplish the techniques. The special-purpose computing devices may be desktop computer systems, portable computer systems, handheld devices, networking devices or any other device that incorporates hard-wired and/or program logic to implement the techniques.

For example, FIG. 9 is a block diagram that illustrates a computer system 900 upon which an embodiment of the invention may be implemented. The computer system 900 includes a bus 902 or other communication mechanism for communicating information, and a hardware processor 904 coupled with the bus 902 for processing information. A hardware processor 904 may be, for example, a general-purpose microprocessor.

The computer system 900 also includes a main memory 906, such as a random access memory (RAM) or other dynamic storage device, coupled to the bus 902 for storing information and instructions to be executed by the processor 904. Main memory 906 also may be used for storing temporary variables or other intermediate information during execution of instructions to be executed by the processor 904. Such instructions, when stored in non-transitory storage media accessible to the processor 904, render the computer system 900 into a special-purpose machine that is customized to perform the operations specified in the instructions.

The computer system 900 further includes a read only memory (ROM) 908 or other static storage device coupled to the bus 902 for storing static information and instructions for the processor 904. A storage device 910, such as a magnetic disk or optical disk, is provided and coupled to the bus 902 for storing information and instructions.

The computer system 900 may be coupled via the bus 902 to a display 912, such as a cathode ray tube (CRT) or light emitting diode (LED) monitor, for displaying information to a computer user. An input device 914, which may include alphanumeric and other keys, is coupled to bus 902 for communicating information and command selections to processor 904. Another type of user input device is a cursor control 916, such as a mouse, a trackball, touchscreen, or cursor direction keys for communicating direction information and command selections to the processor 904 and for controlling cursor movement on the display 912. The input device 914 typically has two degrees of freedom in two axes, a first axis (e.g., x) and a second axis (e.g., y), that allows the device to specify positions in a plane.

The computer system 900 may implement the techniques described herein using customized hard-wired logic, one or more ASICs or FPGAs, firmware and/or program logic which in combination with the computer system causes or programs computer system 900 to be a special-purpose machine. According to one embodiment, the techniques herein are performed by the computer system 900 in response to the processor 904 executing one or more sequences of one or more instructions contained in the main memory 906. Such instructions may be read into the main memory 906 from another storage medium, such as the storage device 910. Execution of the sequences of instructions contained in the main memory 906 causes the processor 904 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as the storage device 910. Volatile media includes dynamic memory, such as the main memory 906. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, content-addressable memory (CAM), and ternary content-addressable memory (TCAM).

Storage media is distinct from but may be used in conjunction with transmission media. Transmission media participates in transferring information between storage media. For example, transmission media includes coaxial cables, copper wire and fiber optics, including the wires that comprise the bus 902. Transmission media can also take the form of acoustic or light waves, such as those generated during radio-wave and infra-red data communications.

Various forms of media may be involved in carrying one or more sequences of one or more instructions to the processor 904 for execution. For example, the instructions may initially be carried on a magnetic disk or solid-state drive of a remote computer. The remote computer can load the instructions into its dynamic memory and send the instructions over a network line, such as a telephone line, a fiber optic cable, or a coaxial cable, using a modem. A modem local to the computer system 900 can receive the data on the network line and use an infra-red transmitter to convert the data to an infra-red signal. An infra-red detector can receive the data carried in the infra-red signal and appropriate circuitry can place the data on the bus 902. The bus 902 carries the data to the main memory 906, from which the processor 904 retrieves and executes the instructions. The instructions received by the main memory 906 may optionally be stored on the storage device 910 either before or after execution by the processor 904.

The computer system 900 also includes a communication interface 918 coupled to the bus 902. The communication interface 918 provides a two-way data communication coupling to a network link 920 that is connected to a local network 922. For example, the communication interface 918 may be an integrated services digital network (ISDN) card, cable modem, satellite modem, or a modem to provide a data communication connection to a corresponding type of telephone line. As another example, the communication interface 918 may be a local area network (LAN) card to provide a data communication connection to a compatible LAN. Wireless links may also be implemented. In any such implementation, the communication interface 918 sends and receives electrical, electromagnetic or optical signals that carry digital data streams representing various types of information.

A network link 920 typically provides data communication through one or more networks to other data devices. For example, the network link 920 may provide a connection through a local network 922 to a host computer 924 or to data equipment operated by an Internet Service Provider (ISP) 926. ISP 926 in turn provides data communication services through the worldwide packet data communication network now commonly referred to as the "Internet" 928. The local network 922 and the Internet 928 both use electrical, electromagnetic or optical signals that carry digital data streams. The signals through the various networks and the signals on the network link 920 and through the communication interface 918, which carry the digital data to and from the computer system 900, are example forms of transmission media.

The computer system 900 can send messages and receive data, including program code, through the network(s), the network link 920 and the communication interface 918. In the Internet example, a server 930 might transmit a requested code for an application program through the Internet 928, the ISP 926, the local network 922 and the communication interface 918.

The received code may be executed by the processor 904 as it is received, and/or stored in the storage device 910, or other non-volatile storage for later execution.

7. Miscellaneous; Extensions

Embodiments are directed to a system with one or more devices that include a hardware processor and that are configured to perform any of the operations described herein and/or recited in any of the claims below.

In an embodiment, a non-transitory computer readable storage medium comprises instructions which, when executed by one or more hardware processors, causes performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. One or more non-transitory computer-readable media storing instructions which, when executed by one or more processors, cause:
   generating a first value that is unique to a particular allocation region within memory;
   generating a second value as a function of the first value and at least a third value that is associated with an object stored within the particular allocation region within memory;
   generating, based at least in part on the second value, a unique object identifier for the object stored within the particular allocation region within memory;
   wherein the first value is a nonce for the particular allocation region and the third value is a seed value associated with the object;
   wherein respective unique object identifiers for respective objects stored within the particular allocation region are generated based at least in part on combinations of at least the nonce and respective seed values for the respective objects.

2. The media of claim 1, wherein the instructions further cause:
   detecting a memory reclamation event within the particular allocation region;
   responsive to detecting the memory reclamation event within the particular allocation region, generating a new value that is unique to the particular allocation region within memory; and
   generating object identifiers for objects newly allocated within the particular allocation region within memory based on the new value.

3. The media of claim 1, wherein the instructions further cause:
   detecting a memory reclamation event within the particular allocation region;
   responsive to detecting the memory reclamation event within the particular allocation region, storing, in at least one of a header of the object or in a table entry mapped to an object pointer, at least one of the unique object identifier or data, including at least the first value, sufficient to redetermine the unique object identifier.

4. The media of claim 1, wherein the third value includes a memory address identifying a location within the particular allocation region in memory where the object is stored.

5. The media of claim 1, wherein the first value is combined with at least the third value by applying a mixing function that mixes bits of the first value with bits of at least the third value.

6. The media of claim 1, wherein the first value is combined with at least a fourth value; wherein the fourth value is obtained or derived from an immutable field of the object.

7. The media of claim 1, wherein generating, based on the second value, the unique object identifier comprises applying a hash function to the second value to derive a hash code; wherein the derived hash code is used as the unique object identifier.

8. The media of claim 7, wherein a runtime environment determines a length for the hash code based at least in part on how many objects have been generated within the runtime environment during program execution.

9. The media of claim 1, wherein the particular allocation region is a first buffer that is local to a first thread and the first value is a first nonce assigned to the first buffer; wherein the instructions further cause generating a second nonce that is unique to a second buffer that is local to a second thread; wherein object identifiers for objects stored in the second buffer are generated as a function of the second nonce and not the first nonce.

10. The media of claim 1, wherein the particular allocation region is shared by a plurality of threads.

11. A method comprising:
generating a first value that is unique to a particular allocation region within memory;
generating a second value as a function of the first value and at least a third value that is associated with an object stored within the particular allocation region within memory;
generating, based at least in part on the second value, a unique object identifier for the object stored within the particular allocation region within memory;
wherein the first value is a nonce for the particular allocation region and the third value is a seed value associated with the object;
wherein respective unique object identifiers for respective objects stored within the particular allocation region are generated based at least in part on combinations of at least the nonce and respective seed values for the respective objects.

12. The method of claim 11, further comprising:
detecting a memory reclamation event within the particular allocation region;
responsive to detecting the memory reclamation event within the particular allocation region, generating a new value that is unique to the particular allocation region within memory; and
generating object identifiers for objects newly allocated within the particular allocation region within memory based on the new value.

13. The method of claim 11, further comprising:
detecting a memory reclamation event within the particular allocation region;
responsive to detecting the memory reclamation event within the particular allocation region, storing, in at least one of a header of the object or in a table entry mapped to an object pointer, at least one of the unique object identifier or data, including at least the first value, sufficient to redetermine the unique object identifier.

14. The method of claim 11, wherein the third value includes a memory address identifying a location within the particular allocation region in memory where the object is stored.

15. The method of claim 11, wherein the first value is combined with at least the third value by applying a mixing function that mixes bits of the first value with bits of at least the third value.

16. The method of claim 11, wherein the first value is combined with at least a fourth value; wherein the fourth value is obtained or derived from an immutable field of the object.

17. The method of claim 11, wherein generating, based on the second value, the unique object identifier comprises applying a hash function to the second value to derive a hash code; wherein the derived hash code is used as the unique object identifier.

18. The method of claim 17, wherein a runtime environment determines a length for the hash code based at least in part on how many objects have been generated within the runtime environment during program execution.

19. The method of claim 11, wherein the particular allocation region is a first buffer that is local to a first thread and the first value is a first nonce assigned to the first buffer; the method further comprising: generating a second nonce that is unique to a second buffer that is local to a second thread; wherein object identifiers for objects stored in the second buffer are generated as a function of the second nonce and not the first nonce.

20. The method of claim 11, wherein the particular allocation region is shared by a plurality of threads.

* * * * *